United States Patent [19]

Betchan

[11] Patent Number: 4,898,330
[45] Date of Patent: Feb. 6, 1990

[54] PORTABLE DEICER SPRAYER

[76] Inventor: Jerry L. Betchan, 6515 Anderson Way, Nampa, Id. 83651

[21] Appl. No.: 102,014

[22] Filed: Sep. 28, 1987

[51] Int. Cl.$^4$ ............................ B05B 1/24; B05B 9/04
[52] U.S. Cl. ...................................... 239/135; 239/337; 239/373
[58] Field of Search ................. 239/13, 130, 131, 135, 239/337, 373; 244/134 C, 134 D

[56] References Cited

U.S. PATENT DOCUMENTS

| 872,561 | 12/1907 | Fess | 239/13 X |
| 2,853,212 | 9/1958 | Anderson | 239/373 |
| 4,191,348 | 3/1980 | Holwerda | 244/134 C |
| 4,723,733 | 2/1988 | McClinchy | 244/134 C |

FOREIGN PATENT DOCUMENTS 30454  6/1981  European Pat. Off. ............ 239/135

Primary Examiner—Andres Kashnikow
Assistant Examiner—Patrick N. Burkhart
Attorney, Agent, or Firm—Frank J. Dykas; Craig M. Korfanta

[57] ABSTRACT

Deicer sprayer for deicing aircraft includes a deicer fluid container with an enclosed thermostatically controlled electrical heater designed for connection to an external power source to heat deicer fluid prior to its application to an aircraft wing. A flexible line having a hand operated valve, a wand and an adjustable spray nozzle connected to the container allow directed delivery of the deicing fluid. The deicer fluid container can be enclosed within a thermal insulation blanket which helps to maintain the deicer fluid temperature during system use. Attached to the deicer fluid container is a carrying strap and harness which permits the individual user to move about easily during the operation of the portable deicer sprayer system while deicing aircraft.

1 Claim, 2 Drawing Sheets

PORTABLE DEICER SPRAYER

BACKGROUND OF THE INVENTION

1. Field of Invention

The present invention relates to deicing sprayers for airplane wings and more particularly to a new and improved portable insulated sprayer which includes integrated system to preheat the deicing fluid prior to or during its application to the airplane wings.

2. Description of the Prior Art

As can be appreciated, there are numerous portable sprayers and liquid dispensers available for commercial use that are insulated and electrically heated. For example U.S. Pat. No. 4,222,521 discloses a device where the contemplated use is cleaning brake drums. This device appears to be bulky and complicated in operation, requiring an external source of pressurized air. U.S. Pat. No. 2,091,838 also describes a portable, electrically heated sprayer and liquid dispenser. U.S. Pat. Nos. 4,414,037 and 1,889,507 disclose dispensing apparatus that is electrically heated. The other patents are representative of what is in the prior art. Because all of these systems vary in construction from each other, it is difficult to judge accurately their effectiveness and while it is proper to assume that they do operate in the alleged manner it is reasonable to assume that there is a continuing need for improvements in such portable heated sprayers. Through detailed analysis and testing it appears that the present invention contributes substantially to such needed improvements, particularly for the deicing of airplane wings.

SUMMARY OF INVENTION

It is an object of the present invention to provide a new and improved portable system for deicing airplane wings which has all of the advantages of the prior art and none of the disadvantages.

It is another object of the present invention to provide a new and improved deicing system which is easily portable and may be used conveniently on a wide variety of large and small aircraft by one or more persons.

It is a further object of the present invention to provide a new and improved portable deicing system which may be easily and efficiently manufactured and which may be assembled and used in a rapid and easily understood manner.

It is a further object of the present invention to provide a new and improved portable deicing system which will prove to be of a durable and rugged construction under extended use situations.

Even another object of the present invention is to provide a new and improved portable deicing system which may be of a low cost of manufacture with regard to both materials and labor and thus may be sold to the consuming public at low and reasonable prices.

Still another object of this invention is to provide a new and improved deicing system which may be carried aboard and conveniently stored on smaller aircraft.

An even further object of the present invention is to provide a new and improved portable deicing system which may be used to improve the deicing capabilities of conventional deicing fluids for use on affected airplane wings.

The general purpose of the present invention, which will be described in greater detail later, is to achieve these objects through the use of an improved portable deicing system for airplane wings. To attain this the present invention envisions a portable, insulated deicing fluid container, which includes a thermostatically controlled heater, connectable to a standard electrical power source. The container has a fluidly connected flexible hose with an adjustable spray nozzle to deliver the deicing fluid to the affected airplane wings. The temperature controlled heater may be used to raise the temperature of the deicing fluid to facilitate delivery and enhance the deicing ability of the fluid. The container has a manually operated pump to increase the internal air pressure and drive the deicing fluid from the container and through the adjustable spray nozzle to the affected airplane wing surface. The container is easily refillable through a standard sealable cover.

DETAILED DESCRIPTION OF THE PREFERRED EMBODIMENT

Figure 1:
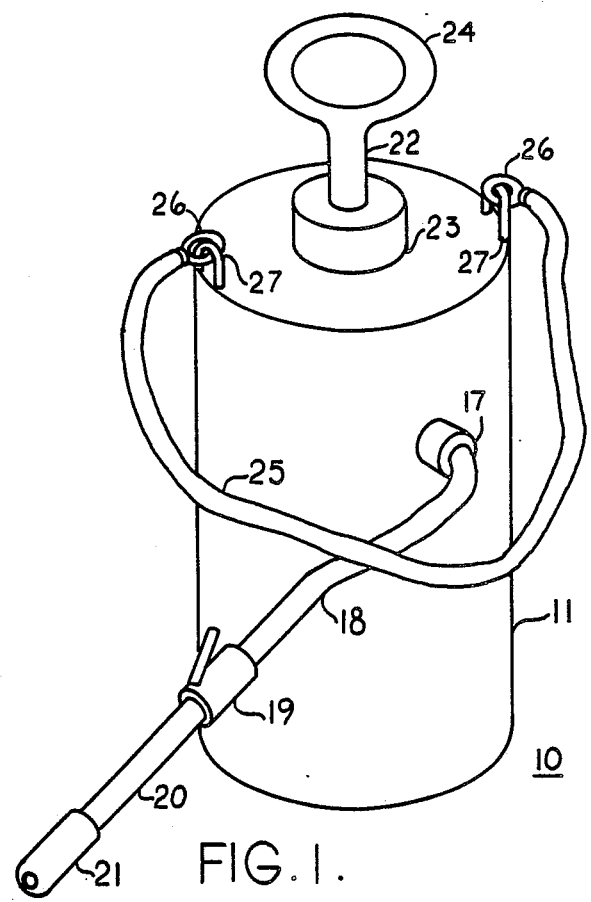
FIG. 1 is a perspective representational view.
Figure 2:
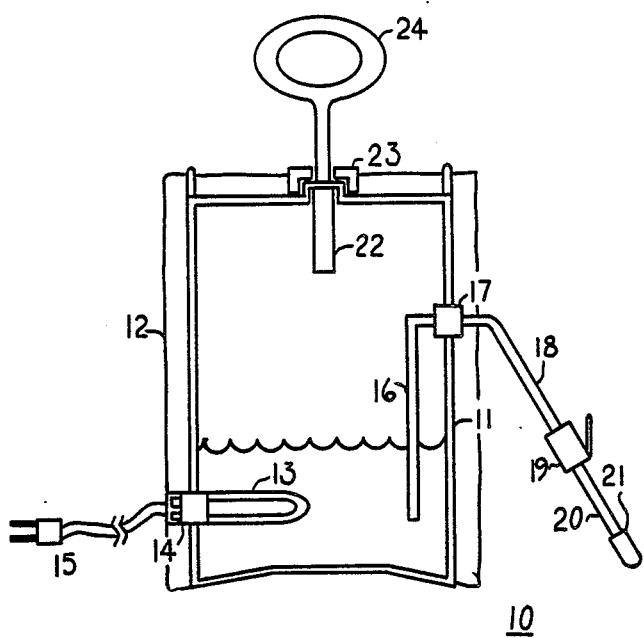
FIG. 2 is a representational side view.

With reference now to the drawings and in particular to FIGS. 1 and 2 thereof, a new and improved portable deicing sprayer system embodying the principles and concepts of the present invention and generally designated by the reference numeral 10 is disclosed. It can be seen that the deicer sprayer system 10 is designed for portable use in the deicing of airplane wings and other affected airplane surfaces. As shown, the deicer sprayer system includes a deicer fluid tank 11 and air pressure source 22 pneumatically interconnected thereto. The air pressure in tank 11 forces the deicer fluid through the spray tube 16 fluidly interconnected thereto and through an integral attachment nipple 17 in an understood manner through flexible hose 18 to a manually controlled conventional valve 19 fluidly connected to and located externally to fluid tank 11. Deicer fluid then flows from valve 19 through wand 20 which is fluidly connected between valve 19 and adjustable spray nozzle 21 and is then delivered to an airplane wing surface by the operator in a conventional and well understood manner. Of course all of system 10 described thus far is of a conventional construction and forms no part of the present invention. In this regard, the present invention is designed for addition to the conventional deicer sprayer construction as thus far described.

Continuing with the discussion of the present invention as illustrated in FIG. 2, it will be noted that the same includes, in one preferred construction, a cylindrical tank 11 formed from stainless steel and of size and shape for convenient, in flight, storage in the aircraft. As illustrated, a manually operated air pump 22 is of conventional design attached in a well understood manner with an integral attachment fitting 23 to the top of tank 11. Air pump handle 24, as illustrated, is used to supply the air pressure to tank 11. Air pump 22 is easily removable to allow manual refilling of tank 11 with deicer fluid in a conventional and understood manner.

As illustrated, invention 10 further includes a thermostatically controlled, electrically powered, fluid heater 13, of conventional design, installed internally in an understood manner through an integral heater attachment nipple 14 within tank 11 and which operates to heat the deicer fluid prior to its application to an airplane wing surface. Once the deicer fluid is heated to its operating temperature of approximately 200 degrees fahrenheit the thermostat in the fluid heater 13 will help to maintain such temperature. Power cord 15 is provided to reach available electrical power from external airport sources.

The invention further includes a removable, cylindrical thermal insulation blanket 12 circumferentially positioned as illustrated, about tank 11. It is so designed to minimize heat loss from tank 11, permit electrical access to the internal fluid heater 13 and permit fluid transfer through flexible hose 18 and to allow operation of air pump 22. This insulation blanket 12 is composed of conventional thermal insulation material possessing low heat conductivity and being of rugged and durable construction suitable for external use in severe climates.

Also forming a part of the invention, in one preferred configuration, is a conventional, adjustable, shoulder strap-harness 25 attached by removable metal snaps 26 connected mechanically to conventional hand grips 27 which are attached to the top part of tank 11. Such adjustable shoulder strap-harness 25 permits the user to carry the portable deicer sprayer with ease and convenience while leaving the hands free to move about and direct the application of the deicer fluid to the affected airplane wing surfaces using the flexible hose 18 and wand 20 and nozzle 21.

With respect to the above description then, it should be realized that the optimal dimensional relationships for the parts of the invention, to include variations in size, materials, shape, form, temperature range, function and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Accordingly,

What I claim is:

1. Portable sprayer means for deicing of airplane wings comprising:

deicer fluid container means for pressurized holding of deicer fluid prior to delivery to the airplane surface;

manually operated air pump means for pressurizing said container means operably detachable from the container means for refilling said container means with deicer fluid;

an electrical heater means for heating deicer fluid before delivery of fluid to airplane wing surface disposed within said container means;

thermostatic control means operably connected to the electric heater to maintain a preselected deicer fluid temperature;

thermal insulation blanket means for removably enclosing said container.

* * * * *